United States Patent [19]

Shimazaki

[11] Patent Number: 4,540,113

[45] Date of Patent: Sep. 10, 1985

[54] ULTRASONIC WORKING APPARATUS

[75] Inventor: Masahiro Shimazaki, Kobe, Japan

[73] Assignee: Mitsuboshi Belting Ltd., Kobe, Japan

[21] Appl. No.: 492,454

[22] Filed: May 6, 1983

[30] Foreign Application Priority Data

May 11, 1982 [JP] Japan .............................. 57-68936[U]

[51] Int. Cl.³ .............................................. B29C 27/08
[52] U.S. Cl. ..................................................... 228/1.1
[58] Field of Search ........................ 228/1 R, 1 B, 110; 156/73.1, 73.4, 580.1; 310/26, 323

[56] References Cited

U.S. PATENT DOCUMENTS

| | | | |
|---|---|---|---|
| 2,704,333 | 3/1955 | Calosi et al. | 310/26 |
| 2,792,674 | 5/1957 | Balamuth et al. | 310/26 X |
| 3,733,238 | 5/1973 | Long et al. | 228/1 B X |
| 3,884,738 | 5/1975 | Hofius, Sr. | 228/1 B X |
| 3,904,457 | 9/1975 | Laughlin | 156/73.4 |

Primary Examiner—Kenneth J. Ramsey

Attorney, Agent, or Firm—Wood, Dalton, Phillips, Mason & Rowe

[57] ABSTRACT

An ultrasonic working apparatus including a booster horn defined by a coaxially aligned rod member and plate member. The rod member has one end thereof coupled to the vibrator by a rod coupler, and an opposite end portion coupled to one end of the plate member. The opposite end portion of the plate member is provided with a plurality of workpiece engaging lugs. The upper end of the plate member is substantially congruent with the lower end of the rod member. The plate member has a thickness at the distal end portion less than the thickness at the end thereof coupled to the rod member and has a width at the distal end substantially greater than the width of the end coupled to the rod member. The booster horn has a total axial length substantially equal to one-half the vibratory resonant wavelength. A support collar is provided about the lower portion of the rod member to provide a second support for the apparatus and defines a nodal position of the amplitude of the vibratory force transmitted therethrough.

21 Claims, 8 Drawing Figures

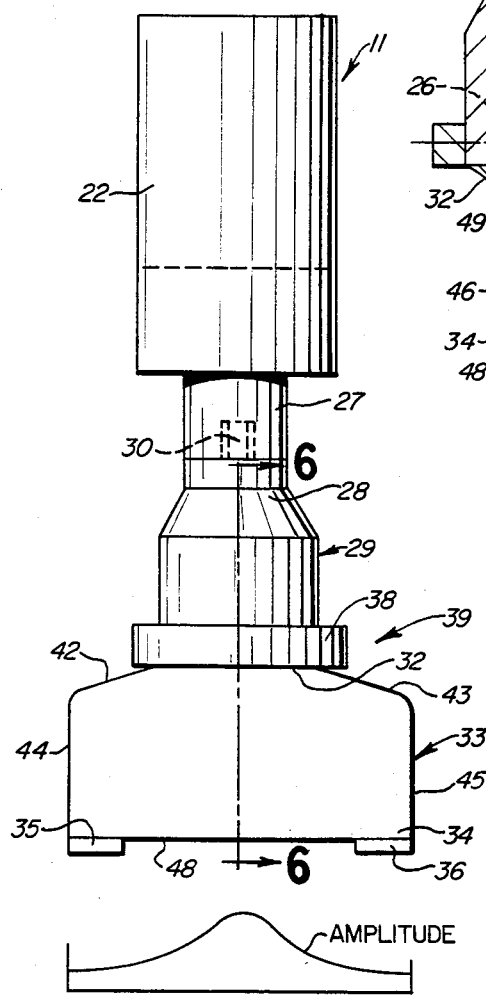
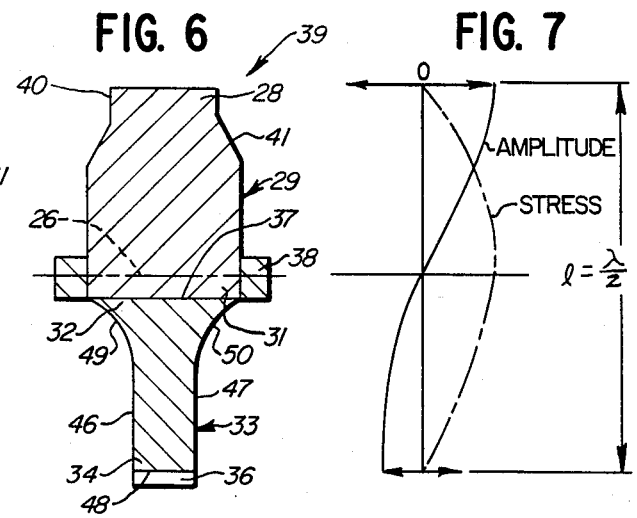
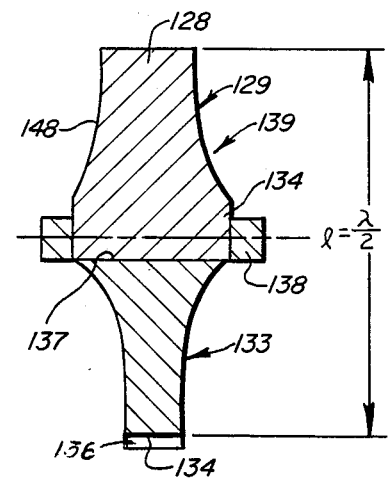

ULTRASONIC WORKING APPARATUS

DESCRIPTION

1. Technical Field

This invention relates to ultrasonic working apparatus, and in particular to ultrasonic inserting machines and the like.

2. Background Art

In a large number of office machines and the like, housings are provided formed of molded plastics. Frequently, it is necessary to insert fastening elements, such as screws, into the housing. Conventionally, ultrasonic inserting apparatuses have been used to effect such insertion and secured engagement of the plastic elements.

One common structure of this type is the use of plastic moldings, such as moldings formed of foamed polystyrene, in association with the housing of computers and other office machines.

The inserting apparatuses of the prior art have had a number of disadvantages. The conventional inserting machines have utilized oscillating means which tended to oscillate about a single support point, causing substantial stresses in the apparatus.

Another problem of the prior art inserting apparatuses has been the objection of the oscillator to direct impact forces, causing damage to the piezoelectric elements, etc., thereof. Further, the known inserting devices have the serious deficiency of being noisy.

Another disadvantage of the prior art inserting apparatuses has been the limitation thereof to a single working position, thereby limiting the efficiency of the insertion operation.

Another problem in the known insertion apparatuses has been the relatively large size thereof, making the use of such apparatuses disadvantageous where only small clearances in the workpiece are available.

One attempted solution to these vexatious probems has been the use of a booster structure intermediate the oscillator and the rod horn engaging the workpiece. The booster serves to change the amplitude and has the advantage of supporting the system at two spaced positions for improved vibratory insertion. However, this apparatus continues to have the serious problem of high noise generation and further aggravates the size problem in requiring substantial increase in the length of the insertion means.

DISCLOSURE OF INVENTION

The present invention comprehends an improved ultrasonic working apparatus which eliminates the deficiencies of the above discussed background art in a novel and simple manner.

More specifically, the invention comprehends providing in an ultrasonic working apparatus having an ultrasonic vibrator, improved means for transferring vibratory working forces from the vibrator to a workpiece, including a booster horn including a coaxially aligned rod member and plate member, the rod member having one end coaxially coupled to the vibrator, and an opposite end, the plate member having one end coaxially coupled to the opposite end of the rod member, and an opposite end provided with distal workpiece engaging means, the plate member having a thickness at the opposite end thereof less than the thickness at the one end thereof, and a width at the opposite end thereof substantially greater than the width at the opposite end thereof.

In the illustrated embodiment, the one end of the plate member is substantially congruent with the opposite end of the rod member to which it is coupled.

Further, in the illustrated embodiment, the booster horn has an axial length substantially equal to one-half the vibrator resonant wavelength.

In the illustrated embodiment, said first end of the plate member tapers in thickness toward the opposite end of the plate member and, as shown, has a constant thickness adjacent the opposite end thereof.

In the illustrated embodiment, the first end of the plate member increases in width toward the opposite end of the plate member and has a constant width adjacent the opposite end thereof.

In the illustrated embodiment, the workpiece engaging means comprises lugs at the opposite widthwise end of the plate member opposite end portion.

In the illustrated embodiment, the means for securing the plate member to the rod member is substantially centered between the rod member one end and the plate member opposite end.

The securing means, as shown, may comprise a collar extending about the opposite end of the rod member.

In the illustrated embodiment, the opposite end of the rod member and one end of the plate member comprise facially abutted congruent surfaces which, as shown, may comprise circular surfaces.

In the illustrated embodiment, the opposite end of the plate member defines a distal, substantially rectangular end surface on which the workpiece engaging means are provided.

In one embodiment, the plate member tapers in thickness continuously from said one end thereof to the opposite end thereof.

The improved ultrasonic working apparatus of the present invention is extremely simple and economical of construction while yet effectively eliminating the disadvantages and problems of the background art structures discussed above.

BRIEF DESCRIPTION OF THE DRAWING

Other features and advantages of the invention will be apparent from the following description taken in connection with the accompanying drawing wherein:

FIG. 4 is a side elevation of the ultrasonic inserter embodying the invention;

FIG. 5 is a graph showing the amplitude of the distal end of the plate member of the ultrasonic inserter of FIG. 4;

FIG. 6 is a transverse section taken substantially along the line 6—6 of FIG. 4;

FIG. 7 is a graph illustrating the variation in amplitude and stress between the opposite ends of the booster horn structure; and FIG. 8 is a cross section of a modified form of booster horn structure embodying the invention.

BEST MODE FOR CARRYING OUT THE INVENTION

Figure 2:
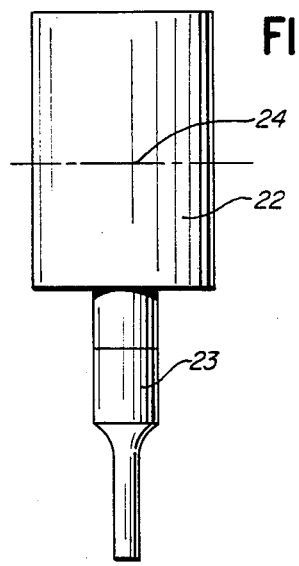
FIG. 2 is a side elevation of an ultrasonic inserter of the prior art.

In the illustrative embodiment of the invention as disclosed in the drawing, a fastener inserting apparatus generally designated 10 includes an ultrasonic working apparatus generally designated 11 for transferring vibratory working forces to a workpiece W carried on a base 12 of apparatus 10. The base may be provided with suitable wheels 13. An adjustable support 14 is mounted to the base for vertically adjustably positioning apparatus 11 carried on an arm 15 at the upper end of support 14. The arm is adjustably positioned by a slide shaft 16 axially movable through a pair of annular bearings 17 and 18.

Vertical positioning of the slide shaft is effected by an air cylinder 19 connected to the lower end of the slide shaft by a connector 20 for selectively effecting desired vertical positioning of the working apparatus 11. A height adjusting collar 21 may be provided on the slide shaft for controlling the disposition thereof.

Thus, in normal use, the ultrasonic working apparatus 11 is brought into engagement with a fastener to be applied to the workpiece, and upon operation of the ultrasonic working apparatus, improved insertion of the fastener thereinto is effected.

As discussed above, it has been conventional to utilize in such apparatuses an ultrasonic working apparatus, such as illustrated in FIG. 2, including an oscillator, or vibrator, 22 directly coupled, to a rod horn 23. The rod horn has an exponential shape and a length substantially equal to one-half the vibrator resonant wavelength. Such vibrators tend to resonate about a supporting position, such as position 24 illustrated in FIG. 2, causing substantial stresses in the vibrator.

Another disadvantage of the prior art vibrator of FIG. 2 is that the oscillator 22 thereof is subject to direct impact, often causing damage to the piezoelectric component and other stress-sensitive elements of the device. Further, as discussed above, it has been found that such vibrators have the serious problem of high noise generation in use.

Figure 3:
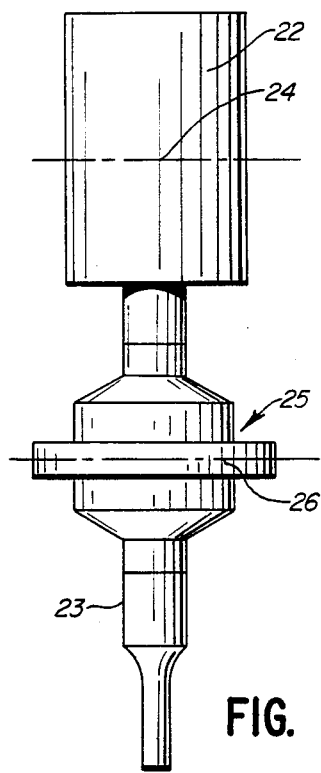
FIG. 3 is an elevation of another form of ultrasonic inserter of the prior art.

One attempted solution to the problem, as discussed above, has been to provide an ultrasonic working apparatus of this type wherein a booster generally designated 25 is provided for changing the amplitude of the vibration and stresses. As shown in FIG. 3, the booster has a length substantially equal to the length of the horn 23. This arrangement has the advantage of providing two support positions, namely support position 24 of oscillator 22, and a second support position 26 at the booster 25. This apparatus, however, continues to have the serious and vexatious problem of high noise level. In addition, the proposed solution of FIG. 3 causes the device to be unsuitable for use in many applications because of the extreme length thereof.

The present invention comprehends an improved inserting apparatus 11, as shown in greater detail in FIGS. 4 and 6. Working apparatus 11 includes a conventional oscillator 22 provided with a rod coupler 27. One end 28 of a rod member 29 is secured to the distal end of the rod coupler by suitable fastening means, such as screws 30. The other end 31 of the rod member is secured to one end 32 of a plate member 33. The other end 34 of the plate member is provided with a pair of fastening lugs 35 and 36 for engaging the workpiece, such as fastening elements to be inserted in a plastic molding or the like.

In the illustrated embodiment, rod member end 31 is right circularly cylindrical and the end surface 37 of plate member end portion 32 is complementary thereto and in congruent facial abutment therewith. An annular collar 38 is disposed concentrically about rod member end portion 31 to define a second support at the midportion of the booster horn generally designated 39 comprising the associated rod member 29 and plate member 33.

As shown in FIG. 6, end portion 28 of rod member 29 is defined by an upper right circularly cylindrical portion 40 and a downwardly widening frustoconical portion 41. The body of the rod member including the lower portion 31 continues right circularly cylindrically from the lower end of the frustoconical portion 41.

As indicated above, the upper surface of plate member upper portion 32 is circularly congruent to the lower end of the rod member portion 31. As seen in FIG. 4, the plate member widens laterally from end portion 32 to define downwardly divurging upper surfaces 42 and 43. The body of the plate member is defined by opposite vertical side surfaces 44 and 45, respectively, spaced apart a distance substantially greater than the diameter of the rod member portion 31.

Referring to FIG. 6, the upper end portion 32 of plate member 33 tapers downwardly from upper surface 37 to the lower portion 34 which, as shown, comprises a constant thickness portion defined by opposite surfaces 46 and 47.

The distal bottom surface 48 of the plate member lower portion 34 is substantially rectangular, as illustrated in FIGS. 4 and 6.

As shown in FIG. 7, the total length l of the booster horn 39 is one-half the resonant wavelength of oscillator 22. As further illustrated, the amplitude of the vibration induced in the booster horn is maximum at the upper end 28 of the rod member 29 decreases to zero at the support collar 38 and reversely increases to a maximum at the end surface 48 and, thus, at the insertion lugs 35 and 36. Similarly, the stress developed in the booster horn increases from end portion 28 to a maximum at support collar 38 and again reduces to a minimum at the surface 48.

Referring to FIG. 5, the vibratory amplitude of the plate member bottom portion 34 is greatest at the center and decreases toward the opposite sides of the plate member, i.e. toward lugs 35 and 36. As can be seen in FIG. 5, the amplitude rises sharply in the center portion aligned with the rod member portion 29 of the booster horn. Resultingly, it would appear that higher harmonics of the vibratory force are generated at the lugs 35 and 36. Further, it has been found that relatively small amplitude horizontal elastic waves are generated along the distal surface 48 at the opposite sides of the plate member adjacent lugs 35 and 36.

In a modified form of booster horn embodying the invention generally designated 139 illustrated in FIG. 8, rod member 129 thereof is defined by an outer surface 148 which gradually increases from the upper portion 128 thereof to a right circularly cylindrical lower portion 134 within the annular support 138.

Similarly, the plate member 133 tapers gradually downwardly from the upper surface 137 to the lower surface 134. The total length of the booster horn again is one-half the resonant wavelength of the oscillator. In this form, the amplitude of the vibratory force at the lower surface 134 is somewhat less than the amplitude in booster horn 39 of the first described embodiment, as the total volume of the rod member portion 129 is less than the total volume of rod member portion 29 of booster horn 39.

INDUSTRIAL APPLICABILITY

The ultrasonic working apparatus of the present invention provides an improved low noise, highly efficient means for inserting fasteners and the like, such as when used in an inserting apparatus 10. The apparatus is advantageously adapted for inserting screws and similar fasteners into plastic moldings of office machines, computers, etc.

The apparatus provides improved facilitated insertion with minimum noise and, thus, provides substantial improvement over the prior art devices discussed above.

By virtue of providing two working positions, substantially doubled working efficiency is obtained. Further, by virtue of maintaining the total length of the booster horn at substantially one-half the wavelength of the vibrator oscillator, the apparatus is advantageously adapted for use with work spaces having relatively small dimensions.

The apparatus is advantageously adapted for use with high frequency electric vibrators utilizing piezoelectric, magnostrictive, and electrostrictive devices for effecting the desired oscillations.

The apparatus provides two positions of support, thereby providing improved vibratory force transmission The tapering surfaces 49 and 50 of the plate member extending downwardly from surface 37 are preferably exponential, or catenoid surfaces for sharing optimum transmission of the desired insertion vibrations. In the illustrated embodiment, the width of the plate member between surfaces 44 and 45 is in the range of approximately 4 to 8 times the thickness of the plate member lower portion 34 between surfaces 46 and 47, and is substantially greater than the diameter of rod member portion 31 and surface 37. Thus, where the width of the plate member between surfaces 44 and 45 is made greater than that illustrated in FIG. 4, it is preferable that the thickness thereof between surfaces 46 and 47 be similarly increased so as to maintain the ratio, as discussed above.

Figure 1:
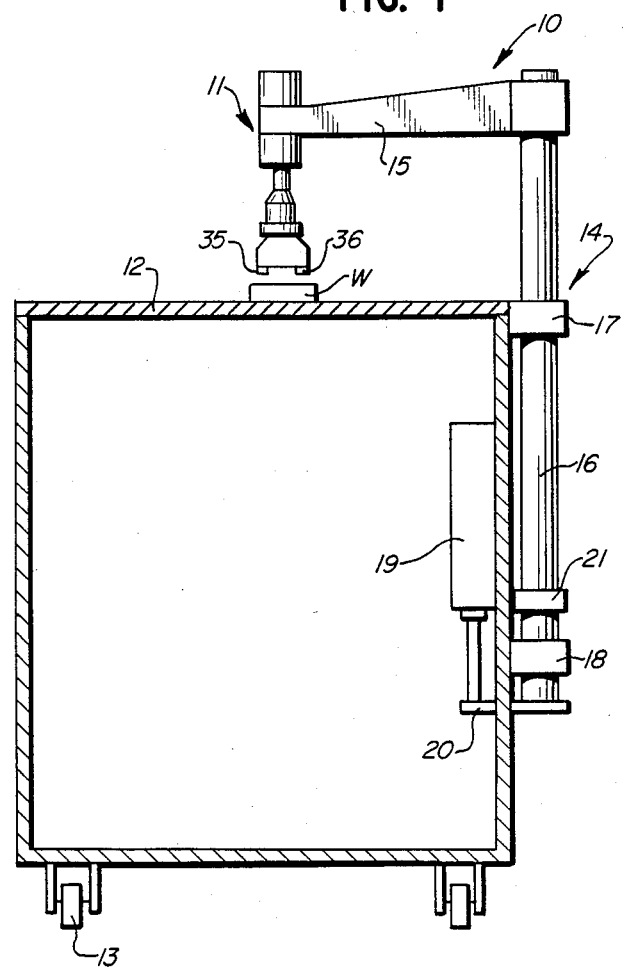
FIG. 1 is an elevation illustrating an inserting machine of the prior art provided with an ultrasonic inserter embodying the invention.

The vibratory forces delivered through the booster horn are unique as illustrated in FIGS. 5 and 7. In one illustrated embodiment, wherein the booster horn was installed in an insertion apparatus 10, as illustrated in FIG. 1, a measurement of approximately 85 horns was determined as developed in the insertion of screws to be press-fit to a plastic molding. The corresponding measurement made with an inserting device of the prior art, as shown in FIG. 1, was approximately 99 to 103 horns.

The conversion of a portion of the longitudinal waves to horizontal waves at the end surface 48 has been found to substantially reduce sound resulting from the vibratory press-fitting of the fastener as compared to the prior art structures.

Further, by supporting the booster horn at the support collar 38, excessive loads in the oscillator 22 are avoided, further effectively minimizing possible damage to the components thereof and substantially extending the useful life of the apparatus.

By maintaining the total length of the booster horn at one-half the wavelength of the oscillator, the ultrasonic working apparatus of the present invention is advantageously adapted to a wide range of applications, including application of fasteners to small moldings and the like.

The foregoing disclosure of specific embodiments is illustrative of the broad inventive concepts comprehended by the invention.

I claim:

1. In an ultrasonic working apparatus having an ultrasonic vibrator, improved means for transferring vibratory working forces from the vibrator to a workpiece, comprising a booster horn including a coaxially aligned rod member and plate member, said rod member having one end coaxially coupled to said vibrator, and an opposite end, said plate member having one end coaxially associated with said opposite end of the rod member, and an opposite end provided with distal workpiece engaging means, said plate member having a thickness at said opposite end thereof less than the thickness at said one end thereof and a width at said opposite end thereof substantially greater than the width at said one end thereof, said workpiece engaging means comprising spaced projections at opposite ends of the widthwise extent of said opposite end of the plate member.

2. The ultrasonic working apparatus of claim 1 wherein said one end of the plate member is substantially congruent with said opposite end of the rod member to which it is coupled.

3. The ultrasonic working apparatus of claim 1 wherein said first end of the plate member tapers in thickness toward said opposite end of the plate member.

4. The ultrasonic working apparatus of claim 1 wherein said plate member has a constant thickness adjacent said opposite end thereof.

5. The ultrasonic working apparatus of claim 1 wherein said one end of the plate member tapers in thickness and increases in width toward said opposite end of the plate member.

6. The ultrasonic working apparatus of claim 1 wherein said plate member has a constant thickness and width adjacent said opposite end thereof.

7. The ultrasonic working apparatus of claim 1 wherein said one end of the plate member tapers in thickness and increases in width toward said opposite end of the plate member and said plate member has a constant thickness adjacent said opposite end thereof.

8. The ultrasonic working apparatus of claim 1 wherein said one end of the plate member tapers in thickness and increases in width toward said opposite end of the plate member, and said plate member has a cosntant thickness and width adjacent said opposite end thereof.

9. The ultrasonic working apparatus of claim 1 wherein said plate member has a constant thickness adjacent said opposite end thereof and increases in width toward said one end of the plate member.

10. The ultrasonic working apparatus of claim 1 wherein said first end of the plate member tapers in thickness toward said opposite end of the plate member and said plate member has a constant thickness and width adjacent said opposite end.

11. The ultrasonic working apparatus of claim 1 wherein said workpiece engaging means comprises lugs at the opposite widthwise ends of said plate member opposite end.

12. The ultrasonic working apparatus of claim 1 wherein said booster horn has an axial length substantially equal to one-half the vibrator resonant wavelength.

13. In an ultrasonic working apparatus having an ultrasonic vibrator, improved means for transferring vibratory working forces from the vibrator to a workpiece, comprising:
   a booster horn including a coaxially aligned rod member and plate member, said rod member having one end coaxially coupled to said vibrator, and an opposite end, said plate member having one end coaxially coupled to said opposite end of the rod member, and an opposite end provided with distal workpiece engaging means, said plate member having a thickness at said opposite end thereof less than the thickness at said one end thereof and a width at said opposite end thereof substantially greater than the width at said one end thereof, said workpiece engaging means comprising spaced projections at opposite ends of the widthwise extent of said opposite end of the plate member, the axial length of said plate member being substantially equal to the axial length of said rod member, said plate member being associated with the rod member substantially centered therewith at said rod member one end and said plate member opposite end; and
   an annular support disposed concentrically thereabout defining the midportion of the booster horn.

14. The ultrasonic working apparatus of claim 13 wherein said support comprises a collar extending about said associated end of the rod member.

15. The ultrasonic working apparatus of claim 13 wherein said booster horn has an axial length substantially equal to one-half the vibrator resonant wavelength.

16. In an ultrasonic working apparatus having an ultrasonic vibrator, improved means for transferring vibratory working forces from the vibrator to a workpiece, comprising
   a booster horn including a coaxially aligned rod member and plate member, said rod member having one end coaxially coupled to said vibrator, and an opposite end, said plate member having one end coaxially associated with said opposite end provided with distal workpiece engaging means, said plate member having a thickness at said opposite end thereof less than the thickness at said one end thereof and a width at said opposite end thereof substantially greater than the width at said one end thereof, said workpiece engaging means comprising spaced projections at opposite ends of the widthwise extent of said opposite end of the plate member, said associated opposite end of the rod member and said one end of the plate member defining a circular cross section.

17. The ultrasonic working apparatus of claim 16 wherein said opposite end of the plate member defines a distal substantially rectangular end surface.

18. The ultrasonic working apparatus of claim 16 wherein said opposite end of the plate member defines a distal substantially rectangular end surface and said workpiece engaging means comprises at least one projection on said end surface.

19. The ultrasonic working apparatus of claim 16 wherein said plate member tapers in thickness continuously from said one end to said opposite end thereof.

20. The ultrasonic working apparatus of claim 1 wherein said plate member tapers in thickness continuously from said one end to said opposite end thereof.

21. The ultrasonic working apparatus of claim 13 wherein said plate member tapers in thickness continuously from said one end to said opposite end thereof.

* * * * *